Sept. 23, 1941. A. KIPNIS 2,256,617
DOUGH EXTRUDING MACHINE
Filed Nov. 19, 1937 3 Sheets-Sheet 2
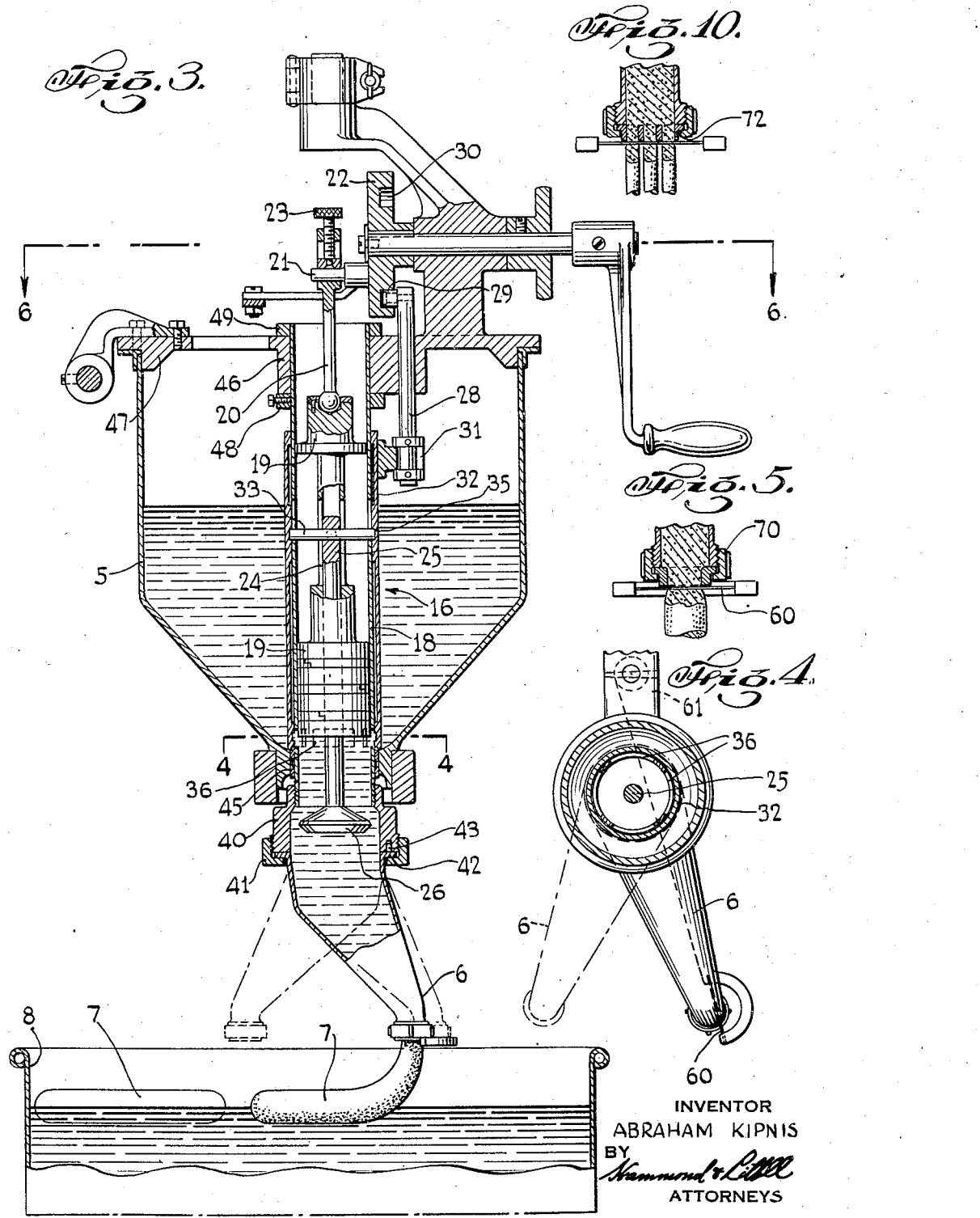
INVENTOR
ABRAHAM KIPNIS
BY
Hammond & Littell
ATTORNEYS Sept. 23, 1941.  A. KIPNIS  2,256,617
DOUGH EXTRUDING MACHINE
Filed Nov. 19, 1937  3 Sheets-Sheet 3
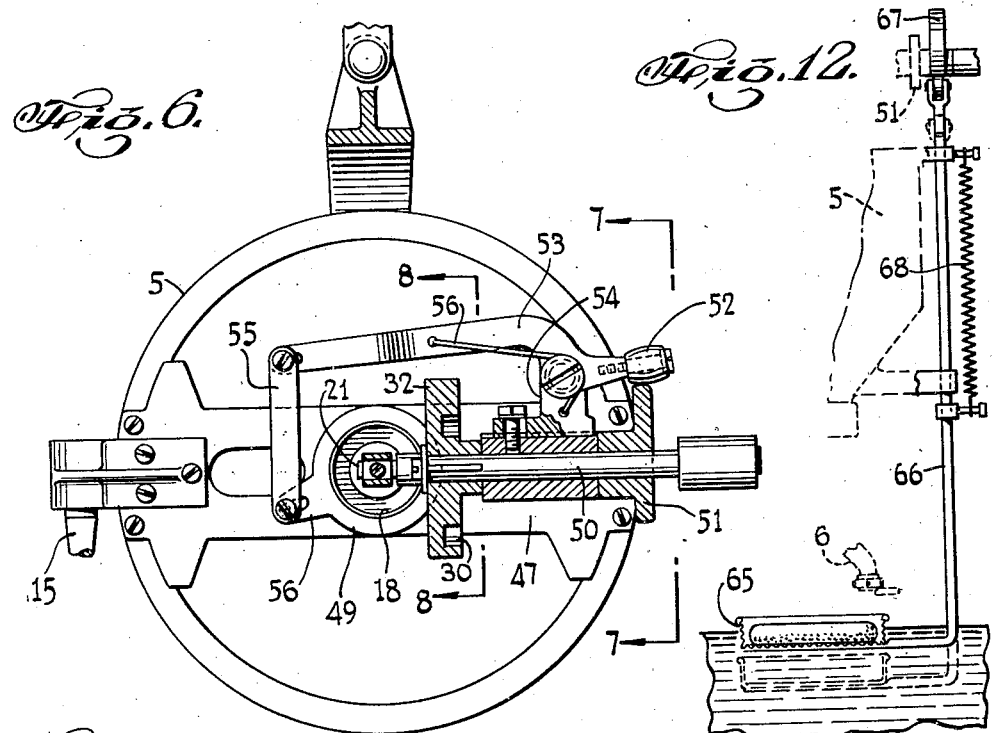
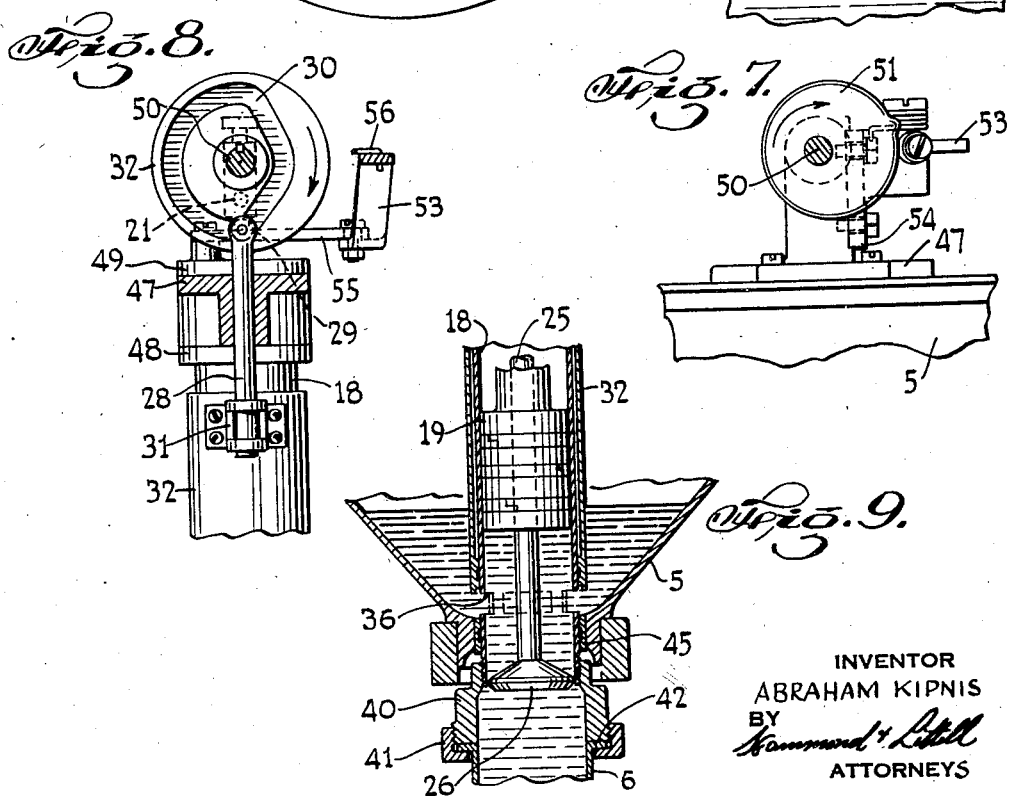
INVENTOR
ABRAHAM KIPNIS
BY
ATTORNEYS Patented Sept. 23, 1941

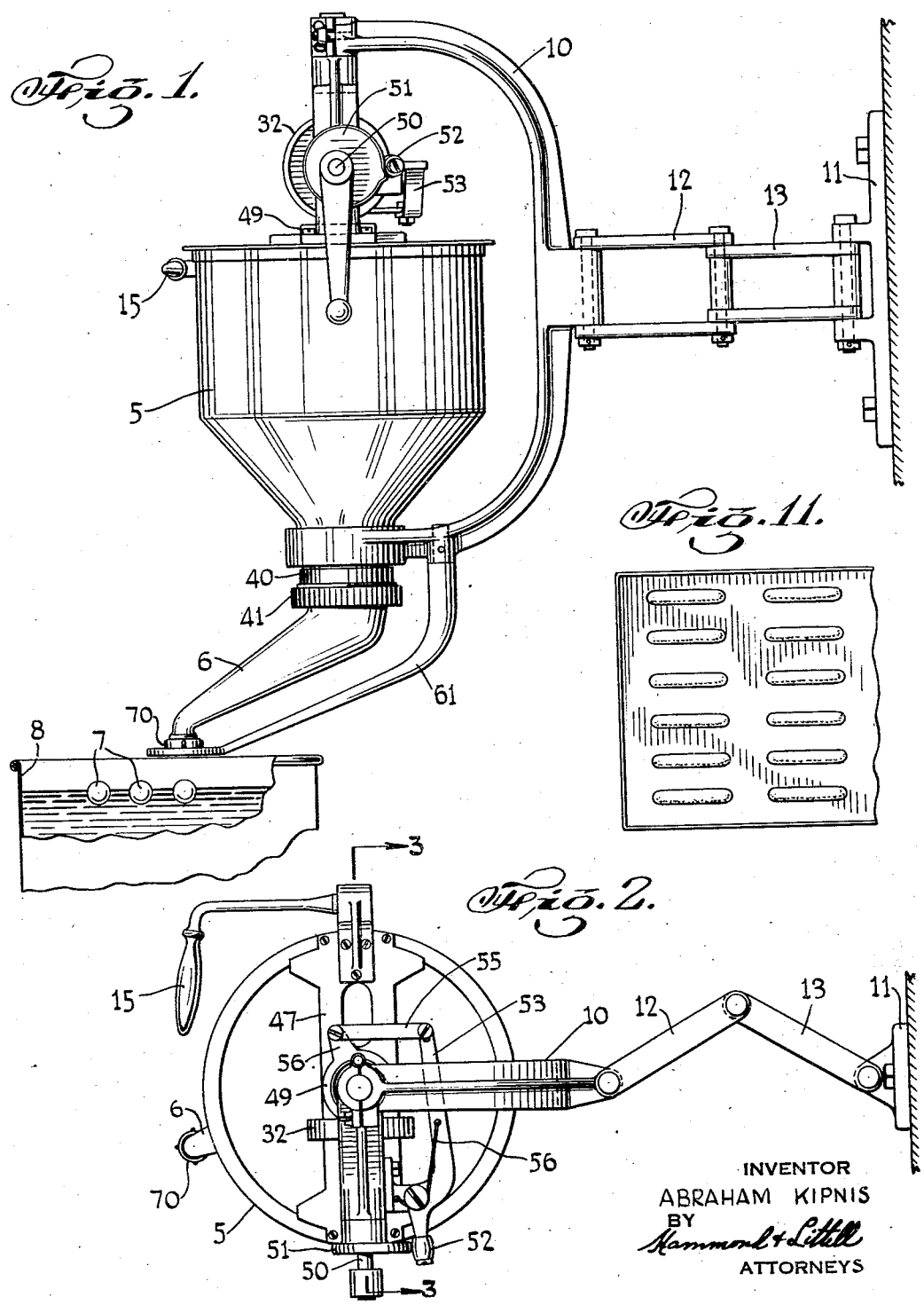

2,256,617

UNITED STATES PATENT OFFICE 2,256,617

DOUGH EXTRUDING MACHINE

Abraham Kipnis, Far Rockaway, N. Y.

Application November 19, 1937, Serial No. 175,390

9 Claims. (Cl. 107—14)

The present invention relates to machines for forming dough or the like into individual formed pieces and has for an object to provide an improved apparatus for extruding successive charges and laying them upon a receiving surface.

Another object of the invention is to provide means to lay successive charges of substantial length flat on the receiving surface.

The invention has been developed more particularly in connection with the production of an apparatus for forming cruller sticks and discharging the same into a bath of hot fat wherein they are cooked and such an apparatus will be more particularly described for the purposes of illustrating the principles of the invention. It will be understood, however, that the particular description is illustrative merely and that the embodiment of the invention shown can be used for other purposes and the principles of the invention can be embodied in other constructions.

The nature and objects of the invention will be better understood from a description of the selected illustrative embodiment for the purpose of which description reference should be had to the accompanying drawings forming a part hereof and in which—

Figure 1 is a side view of a cruller stick machine embodying the invention,

Fig. 2 is a plan view of the same,

Fig. 3 is a sectional view taken on the line 3—3 of Fig. 2,

Fig. 4 is a sectional view taken on the line 4—4 of Fig. 3,

Fig. 5 is a detail sectional view of the nozzle indicating the operation of the cut-off device, Fig. 6 is a sectional plan view taken on the line 6—6 of Fig. 3, Fig. 7 is a detail view mainly in elevation taken on the line 7—7 of Fig. 6, Fig. 8 is a sectional detail view taken on the line 8—8 of Fig. 6, Fig. 9 is a vertical sectional view of the pump and valves, Fig. 10 is a detail sectional view taken through a modified form of nozzle for delivering three similar charges and indicating the operation of the cut-off device, Fig. 11 is a plan view of a tray showing a number of charges of dough laid thereon by the machine, and Fig. 12 is a detail view in side elevation showing a vertically movable screen for receiving the charges in the bath of hot fat.

The machine illustrated comprises a reservoir 5 for a batch of dough to be formed into separate charges in the making of cruller sticks or the like with a nozzle 6 from which the charges 7 are extruded into a bath of fat in a suitable tank 8. The reservoir 5 is carried in a frame or bracket 10 which is supported from a wall bracket 11 for free movement in a horizontal plane by means of links 12 and 13. By this arrangement the reservoir can be readily moved horizontally over the bath, tray or the like in which the successive charges are to be deposited. A handle 15 is conveniently arranged for controlling the movement of the device. A vertically arranged pump 16 is positioned centrally of the reservoir to extrude the dough through the nozzle in a form which may conveniently be referred to as dough sticks 6. The pump comprises a vertical cylinder 18 in which the piston 19 is reciprocated by a connecting rod 20 actuated by a crank pin 21 projecting horizontally from the cam 22.

The length of the operative stroke of the piston can be adjusted to reduce the amount of dough discharged by each operation of the piston by any suitable means. In the arrangement herein illustrated a thumb screw 23 in the upper end of the connecting rod 20 carries a follower slidable in a vertical slot in the upper end of the connecting rod to permit varying amounts of lost motion between the connecting rod 20 and the crank pin 21.

The piston 19 comprises the lower relatively large head carrying suitable piston rings and an upper head rigidly connected thereto by a hollow shaft 24. Within this hollow shaft is mounted the stem 25 of the valve 26 which is movable upwardly against or into the lower end of the cylinder to close the same to prevent air or the dough from being drawn back into the cylinder from the nozzle during the upward movement of the piston. The movement of this valve is controlled from a cam 22 by means of a vertically reciprocating rod 28 having a follower 29 engaging the groove 30 in the cam. The lower end of the rod 28 carries two collars which engage opposite sides of a bracket 31 carried by the sleeve 32 mounted exteriorly of the cylinder 18. A horizontal cross pin 33 extends through the valve stem 25 and at its ends engages in an annular groove 35 on the inner face of the sleeve 32. By this arrangement the sleeve 32 and the valve 26 move vertically and together under control of the cam 22. At its lower end the sleeve 32 is formed as a valve to control flow of dough from the reservoir into the pump cylinder 18 through apertures 36 distributed circumferentially around the cylinder. The timing of the cam 22 and of the crank pin 21 are such that the valve 26 moves upward to close the discharge end of the pump cylinder and the sleeve valve 32 moves upward to open the inlet ports 36 when the pump piston is in its lowermost position and they both return to their previous positions for the discharge operation of the pump after the intake stroke of the pump piston and while the piston is in its uppermost position.

It is important that a relative lateral movement of translation be provided between the discharge end of the nozzle and the tray, bath or other receiving surface on which the successive charges are deposited in the operation of the apparatus when relatively long articles such as cruller sticks are being produced in order to prevent the full charge dropping and compressing into one formless lump. To this end the nozzle 6 is given a movement of a length at least substantially equal to the length of the article formed.

As shown the nozzle 6 is rigidly secured to the lower end of the pump cylinder 18 by means of a coupling 40, one member of which is threaded onto the lower end of the cylinder. The other member of the coupling is in the form of a ring nut 41 which removably clamps the flange 42 of the nozzle 6 in position. A pin 43 secured in the nozzle flange engages a hole in the member 40 to prevent relative rotation of the nozzle.

The pump cylinder 18 is rotatable in the bearing 45 in the bottom of the reservoir and in the bearing 46 in the casting 47 at the top of the reservoir. Collars 48 and 49 secured to the cylinder above and below the bearing 46 prevent undue vertical movement of the cylinder.

Rotation of the cylinder from the main drive shaft 50 is effected by a cam and link mechanism. As shown the cam 51 engages the follower 52 on the horizontal rock lever 53 pivoted in a bracket 54 adjustably secured to the casting 47. This rock lever is adjustably connected by a link 55 to an arm 56 of the collar 49, as by a pin and slot connection. By adjusting the position of the bracket 54 or the effective length of either arm of the lever 53 the movement of the nozzle 6 can be adjusted to the length of arc desired. A spring 56' normally urges the lever 53 in a direction to maintain the follower 52 in contact with the cam 51.

During the extrusion of the dough from the nozzle 6 the nozzle swings providing a movement of translation of the extruding end of the nozzle in an arc which is large enough to provide, so far as the purposes of the machine are concerned, a nearly straight line movement. For instance the radius of the arc is greater than its length as indicated in Fig. 4. At the end of the movement the nozzle passes just above a cut-off wire 60 carried by the bracket 61 secured in the frame 10 which carries the reservoir.

At this end of its movement the nozzle is given a quick relative movement over the wire to cut off and drop the extruded dough. This is accomplished by the conformation of the cam 51 which is provided with a relatively narrow quick acting projection for this purpose as best shown in Fig. 7. This action occurs just as the pump stops extruding dough. The dough may be laid directly into the fat or directly onto the tray or other receiving surface.

In Fig. 12 there is shown as a feature which can be added to the apparatus or omitted a screen tray designed to be supported in the fat to receive the extruded dough. As shown this tray is arranged to be lifted relatively close to the nozzle and held there during the extrusion and thereafter moved downwardly into the fat to permit the cake to float away. As shown, the tray 65 is carried by a vertically movable rod 66 controlled by a cam 67 on the drive shaft 50. In the particular arrangement shown, the rod 66 is lifted by a spring 68 and moved downwardly under control of the cam.

In Fig. 5 the detail construction of the nozzle is illustrated as comprising a nozzle member 70 secured by a ring nut 71 and the operative position of the cut-off wire 60 during the cut off operation is indicated.

In Fig. 10 is shown an alternative form of nozzle member 72 formed with three smaller outlets for extruding three parallel charges of dough. The operative position of the cut-off wire is also indicated in this view.

It will be noted that the contour of the cam and the connecting mechanism for swinging the nozzle is such that the movement of the nozzle is correlated with the movement of the piston of the pump so that the cruller stick or the like as extruded will be of substantially uniform diameter.

As an alternative arrangement the invention may be embodied in a structure in which the movement of translation of the nozzle is accompanied by a similar movement of translation of the reservoir 5, for example, toward and from the supporting bracket 11. A structure for accomplishing this may, for example, include an eccentric on the shaft 50 positioned beside the cam 51, said eccentric being operatively connected to a link, the other end of which is pivoted to the supporting wall bracket 11. Such link may be L-shaped in plan view with the point of the L connected to the bracket 11 by a ball and socket joint above and coaxially with the pivot bolt which connects the link 13 to the wall bracket 11. The eccentricity of the eccentric should be positioned at a right angle to the position of the crank pin 21 to properly time the movement of the nozzle with relation to the timing of the pump.

In this arrangement if the eccentric is positioned as suggested suitable arrangements must be provided to overcome the tendency of the eccentric strap to bind on the eccentric because of the distance of the eccentric from the center of gravity of the moving parts. This can be done by making the eccentric of a construction to resist the stresses that would be applied. This is quite possible because if the joints of the supporting bracket are made relatively frictionless the force necessary to move the weight of the apparatus will not be great. As an alternative construction the eccentric may be positioned closer to the center of gravity of the moving mass by placing it near the inner end of the shaft 50 either inside or outside of the cam 22. The link connecting the eccentric strap with the wall bracket may be of a shape to avoid interference with the link 53 and other parts of the apparatus as will be readily understood. Only slight modifications such as are readily within the skill of draftsman will be necessary in the construction as shown in Figs. 1 to 3 even if the length of movement is to be made even as much as half of the diameter of the reservoir and that is far more than is usually desired in practice.

In such embodiment a modification of the cut-off device is desirable. To this end the cut-off wire may be supported on a slightly flexible rod depending from the frame 10 suitably positioned to hold the wire adjacent the outlet end of the nozzle and a stop arm may be supported from the wall in position to engage and move the wire supporting bar to pass the wire under the nozzle at substantially the end of the operating movement of the nozzle and reservoir.

The dough used should be of such consistency that it will pump and extrude readily and yet it should not be too fluid whereby the extruded charges will lose their shape.

The construction of the parts and the fastening devices therefore are such that the device can readily be taken apart for complete cleaning and easily assembled.

The foregoing particular description discloses one illustrative embodiment of the invention but is illustrative merely and is not intended as defining the limits of the invention. Obviously the inventive principle can be applied to various other devices for making various other articles such as eclairs, lady-fingers, bread-sticks, candy and the like without departing from the scope of the claims.

I claim:

1. A device of the character described for feeding dough comprising a reservoir for dough, a discharge nozzle, means for feeding dough from the reservoir to and through the nozzle to discharge predetermined charges intermittently therefrom, means for moving the nozzle laterally through a predetermined distance during each discharge of dough from the nozzle and a horizontal cut-off device positioned just below the nozzle close to the end of the path of movement thereof whereby as the nozzle moves over the cut-off device the extruded dough is severed.

2. A device of the character described according to claim 1 wherein means is provided for causing a quick relative movement between the nozzle and cut-off device to sever the dough.

3. A device of the character described comprising a reservoir for dough, a pump within said reservoir comprising a rotatable cylinder having an inlet port through the cylinder wall and a piston within said cylinder, a sleeve valve movable on said cylinder to control said port, and means for simultaneously actuating said piston and sleeve valve and for rotating said cylinder.

4. A device of the character described for feeding dough into hot fat to form cruller sticks comprising a reservoir for dough, a discharge nozzle leading downwardly and laterally from said reservoir, said nozzle being moveable in a horizontal arc of greater length than radius, means for supporting said reservoir with the nozzle closely adjacent a receptacle containing hot fat and means for simultaneously extruding dough of predetermined length and swinging the nozzle in an arc to lay the dough in the fat in the form of a cruller stick.

5. In apparatus of the character described for forming cruller sticks, the combination with a container adapted to contain hot fat, of a reservoir for dough supported for movement above said container but closely adjacent thereto, a discharge nozzle leading downwardly and laterally from said reservoir and terminating closely adjacent the fat level in said container, said nozzle being moveable in a horizontal arc the radius of which is greater than its length, and means for moving said nozzle and simultaneously extruding dough therethrough to lay the dough in the fat in the form of a cruller stick.

6. In apparatus of the character described for forming cruller sticks the combination with a container adapted to contain hot fat, of a reservoir for dough supported above said container, a discharge nozzle extending downwardly from said reservoir, a pump for extruding a dough stick of predetermined length from said nozzle, the discharge end of the nozzle extending close to the fat level of said container as compared with the length of the dough stick whereby the dough stick will reach the fat level during the extrusion and means for simultaneously operating the dough extruding pump and giving a movement of translation to the discharge end of the nozzle to lay the dough stick along the surface of the fat.

7. A device of the character described comprising a reservoir for dough, a pump within said reservoir comprising a rotatable cylinder having an outlet port through the cylinder wall and terminating in a downwardly and laterally extending nozzle, a piston within said cylinder and a valve moveable on said cylinder to control said port, and means for simultaneously actuating said piston and said sleeve valve to extrude a dough stick from said nozzle and for rotating said cylinder to give a motion of translation to the discharge end of the nozzle.

8. A device of the character described comprising a reservoir for dough, a pump within said reservoir comprising a rotatable cylinder having an outlet port through the cylinder wall and terminating in a downwardly and laterally extending nozzle, a piston within said cylinder and means for closing said inlet port, and means for simultaneously actuating said piston to extrude dough from said nozzle and rotating said cylinder to give a motion of translation to the discharge end of the nozzle.

9. A device of the character described comprising a reservoir for dough, a pump within said reservoir comprising a rotatable cylinder having an outlet port through the cylinder wall and terminating in a downwardly and laterally extending nozzle, a valve for controlling said inlet port, a piston within said cylinder, a valve for closing the discharge end of said cylinder comprising a valve closure member moveable toward and from the end of the cylinder and a valve stem extending through the piston, means for operating both valves and for actuating said piston and rotating said cylinder all in timed relation to extrude a dough stick from said nozzle during lateral movement thereof substantially as and for the purpose described.

ABRAHAM KIPNIS.